UNITED STATES PATENT OFFICE.

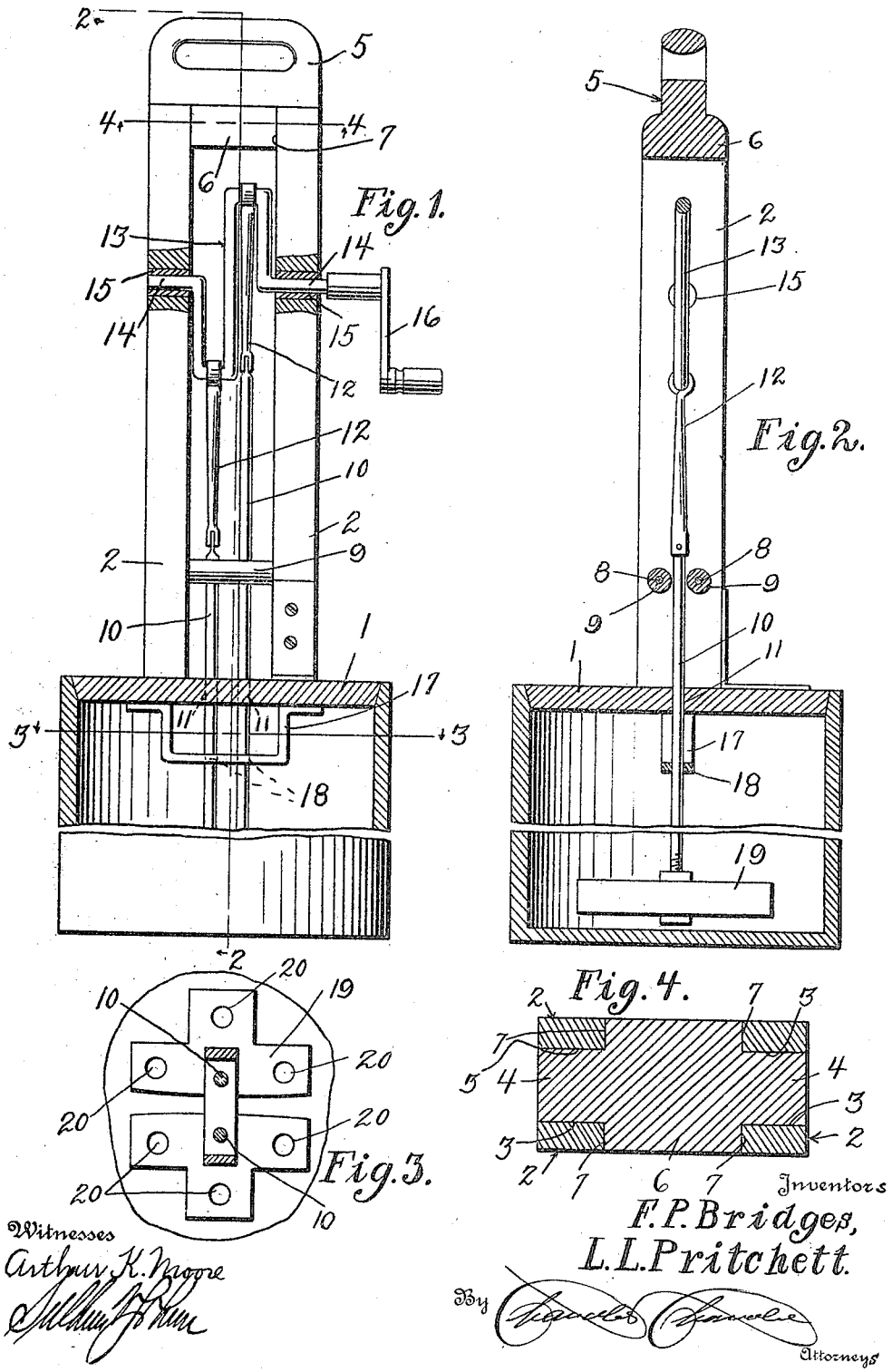

FOUNT P. BRIDGES AND LELAND L. PRITCHETT, OF DEPOY, KENTUCKY.

CHURN-DASHER.

1,306,797.　　　　　Specification of Letters Patent.　　Patented June 17, 1919.

Application filed September 30, 1915. Serial No. 53,459.

*To all whom it may concern:*

Be it known that we, FOUNT P. BRIDGES and LELAND L. PRITCHETT, citizens of the United States, residing at Depoy, in the county of Muhlenberg, State of Kentucky, have invented certain new and useful Improvements in Churn-Dashers; and we do hereby declare the following to be a full, clear, and exact description of the invention, such as will enable others skilled in the art to which it appertains to make and use the same.

The present invention is directed to improvements in churn dashers, and has for its object to provide a dasher with a pair of alternately operating dasher rods.

A further object of the invention is to provide a device of this character having twin dashers adapted to be reciprocated in opposite directions to more effectually agitate the cream, thereby shortening the churning operation.

A still further object of the invention is to provide a device of this character, having associated therewith a cover for the churn.

With these and other objects in view, this invention resides in the novel features of construction, formation, combination and arrangement of parts to be hereinafter more fully described, claimed and illustrated in the accompanying drawing, in which:—

Figure 1 is a front elevation of the device, showing the same in connection with a churn body, the latter being shown in section.

Fig. 2 is a sectional view on line 2—2 of Fig. 1.

Fig. 3 is a similar view on line 3—3 of Fig. 1.

Fig. 4 is a sectional view on line 4—4 of Fig. 1.

Referring to the drawing 1 designates the churn cover, which has mounted thereon in spaced parallel relation uprights 2, said uprights having their upper ends provided with recesses 3, which are adapted to receive the extensions 4 of the handle 5, said handle being provided at its lower edge with a block 6, and with the ends of which the extensions 4 are integrally formed, said block having shoulders 7 which are adapted to engage the inner surfaces of the upper ends of the uprights 2, so as to hold the same in spaced parallel relation.

Supported transversely of the uprights 2 and adjacent the lower ends thereof, are spaced shafts 8, which have mounted thereon rollers 9, which are adapted to engage the dasher rods 10, which pass through the openings 11 formed in the cover 1, and have their upper ends pivotally connected to the links 12, said links being connected to the crank shaft 13, which has it arms 14 journaled in the bearings 15, carried by said uprights. One of the arms 14 has attached thereto a crank handle 16, which serves to actuate the crank shaft to alternately reciprocate the dasher rods 10.

A U-shaped bracket 17 is connected to the under surface of the cover 1, and has its bight portion provided with spaced guides 18, and in which operate the rods 10, said rods having connected to their lower ends dashers 19, which are provided with perforations 20, to more effectually perform the churning operation, said dashers being so formed that they will pass each other during the reciprocation of the dasher rods.

By providing the rollers 9, and the bracket 17, it is obvious that the rods 10 during their reciprocation will be in a substantially perpendicular line, said rollers serving to prevent any undue friction.

From the foregoing description it will be seen that upon rotation of the crank shaft 13, that reciprocatory movement will be imparted to the dasher rods, and dashers, and that the device can be readily removed from the churn body upon grasping the handle 5, which may be also grasped to steady the device during the operation thereof, and to hold the cover 1 in place on the churn body.

What is claimed is:—

1. In a churn dasher, the combination with a churn cover; of spaced uprights supported by the cover and having alined recesses formed in their upper ends, a handle grip having a block at its lower portion with extensions at the ends thereof fitting said recesses whereby said block and uprights form a member of substantially rectangular cross section, dasher rods supported between said uprights, guide means for said dasher rods and means for actuating said rods.

2. In a churn, a cover adapted to fit a churn receptacle, spaced uprights supported by the cover and braced thereto in spaced parallel relation, a block connecting the upper ends of the uprights to hold the same in rigid position and forming a handle for steadying or transporting the churn, a crank shaft journaled in the uprights, spaced guide rollers journaled in the uprights near the lower ends thereof, a U-shaped guide member secured to the bottom of the cover and having spaced guide apertures alining with corresponding apertures in the cover, dasher rods having connection with the crank shaft for vertical reciprocation upon rotation of the shaft and dashers at the lower ends of the rod adapted to pass each other upon reciprocation thereof.

In testimony whereof we affix our signatures in the presence of two witnesses.

FOUNT P. BRIDGES.
LELAND L. PRITCHETT.

Witnesses:
HAL. N. EAVES,
JNO. T. REYNOLDS, Jr.

Copies of this patent may be obtained for five cents each, by addressing the "Commissioner of Patents, Washington, D. C."